July 12, 1932.  G. H. PHELPS  1,867,028

WELDING

Filed July 15, 1927

INVENTOR
GEORGE H. PHELPS.
BY
D. Anthony Usina, ATTORNEY

Patented July 12, 1932

1,867,028

UNITED STATES PATENT OFFICE

GEORGE H. PHELPS, OF WAREHOUSE POINT, CONNECTICUT, ASSIGNOR, BY MESNE ASSIGNMENTS, TO METROPOLITAN ENGINEERING COMPANY, A CORPORATION OF NEW YORK

WELDING

Application filed July 15, 1927. Serial No. 205,928.

In the welding of the end of a stranded or laminated piece of metal by electrical butt welding operations, the weld is sometimes unsatisfactory. An object of the present invention is to provide a method which is particularly beneficial in this class of work.

Another object of the invention is to provide an electric butt weld between a stranded cable and a solid object in which the strands of the cable are not distorted or displaced; and to provide a method of welding the end of a stranded cable to a solid object by electric butt welding and of upsetting said object without displacing or distorting the strands of said cable at or adjacent to said weld.

The accompanying drawing illustrates embodiments of the invention.

Figure 1:
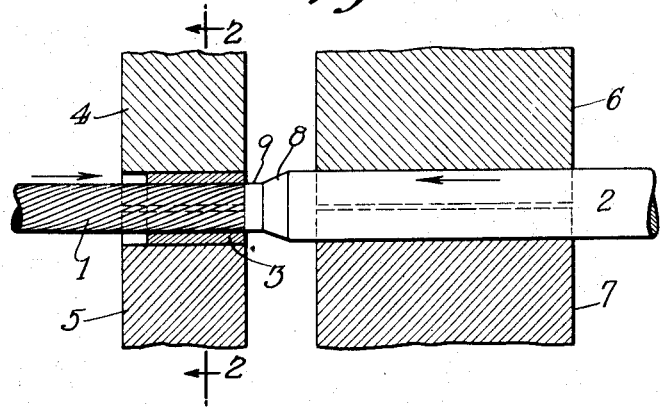
Fig. 1 is a side elevation of the workpieces with adjacent parts of the apparatus in vertical section.
Figure 2:
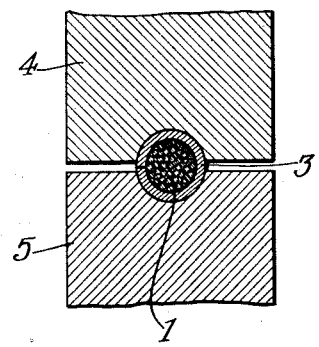
Fig. 2 is a cross section on the line 2—2 of Fig. 1.

The drawing illustrates the butt welding of a copper cable 1 formed of a number of spiral strands to a solid copper terminal 2. In ordinary welding methods, on such workpieces, the resulting weld is imperfect and for some purposes entirely unsatisfactory. When the work is softened by the passage of the electric current and the pieces are pressed together, the outer layer, and sometimes the next layer within it, are displaced or upset laterally and extend into the projecting burr or flash which is subsequently removed. With or without the removal of this burr, the weld is objectionable because of the deflection of the strands from their original longitudinal direction. A straight tensile pull on the cable results in a straight pull only on the centre strand or strands. The further the strands are from the centre of the cable the more angular the pull. The outer strands are pulled with a progressive tearing action, the stress being localized due to the angle at which such strands join the solid terminal.

An object of my present invention is to prevent the spreading of the strands in the upsetting operation by clamping them at their ends. The end of the cable is fitted with a steel sleeve 3 and is clamped between electrodes 4 and 5 of copper which transmit the current to the cable while the latter is pressed in the direction of the arrow. Similar electrodes 6 and 7 of the opposite polarity clamp the solid member 2 so as to pass the welding current across the joint between the cable and the solid piece. The end of the latter is tapered and reduced as at 8 and 9 in order to produce a final product with very little bulge beyond the diameter of the main portion of the member. All of the bulge or enlargement is in the end of the solid member. The resulting weld is very strong, is not weakened if the small bulge, shown at 10 (Fig. 3), be afterwards removed. And it is possible in this way to confine the bulge to such small dimensions as to seldom require removal.

The electrodes 4, 5, 6 and 7 are ordinarily of copper, which by reason of its high heat conductivity makes it difficult, if not impossible, to maintain a welding temperature in a copper workpiece directly in contact with it. By inserting the intermediate steel sleeve 3, of relatively low heat conductivity and high resistance, we can maintain a hot zone around the end of the cable which prevents the heat of the latter from flowing into the cool electrodes so rapidly as to prevent the securing of a good weld.

Figure 3:
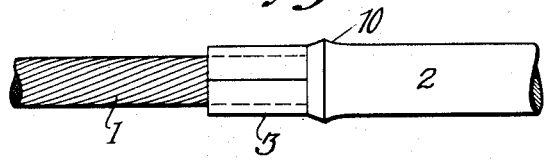
Fig. 3 is a side elevation of the finished product.

The outside surface of the steel sleeve, being in contact with the cool copper electrodes, does not become hot enough to weld to the solid terminal. But if the sleeve be made thick enough, its inner part becomes highly heated and welded to the end of the solid terminal. The finished product then is as shown in Fig. 3 with the steel sleeve 3 welded around the end of the cable and the solid member 2 butt welded thereto; the burr or lateral enlargement 10 being removed or not according to the desired use of the product.

Figure 4:
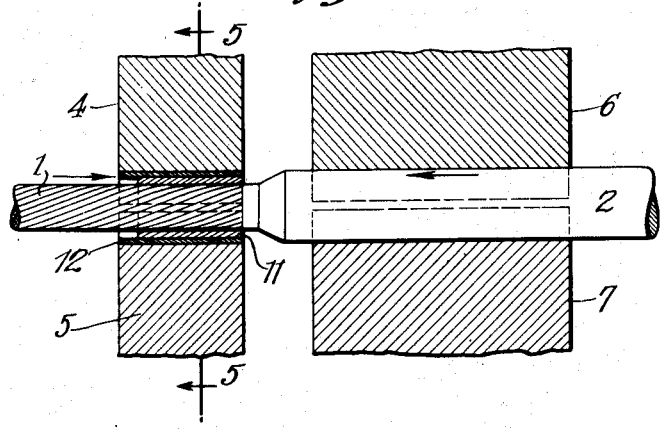
Figs. 4, 5 and 6 are similar views respectively illustrating an alternative.
Figure 5:
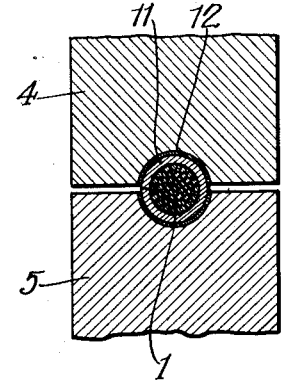

The invention may be applied also in such a way as to secure a copper sleeve to the end of the cable. See Figs. 4, 5 and 6. In this case, a sleeve 11 of copper is mounted on the end of the cable and surrounded during the welding process by a thin steel sleeve 12. The latter for convenience may be split as shown in Fig. 5 and each separate half attached to one of the electrodes as a thin steel lining therefor. The welding operation proceeds as before. The steel is so thin that it remains too cool to weld to the cable or to the solid terminal. But the copper sleeve 11 is heated sufficiently to weld to the solid terminal; the copper, of course, melting and therefore welding at a lower temperature than steel.

Figure 6:
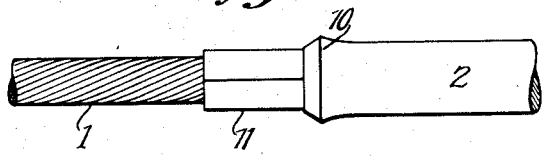

Fig. 6 illustrates the product, the end of the cable being surrounded by the copper sleeve 11 and the solid member 2 being butt welded to the end of the cable and to the copper sleeve 11.

The invention is useful in many other cases in which it is desired to butt weld the end of articles composed of a plurality of longitudinally extending parts which may be called stranded workpieces; and, in fact, wherever it is desirable to confine the end of a workpiece so as to avoid lateral flow thereof.

The reference to "steel" is intended to include iron and various alloys thereof; and the reference to "copper" is intended to include various alloys of this metal.

The scheme for concentrating the heat is applicable to other metals than copper. Wherever the conditions make it disadvantageous to bring the electrodes into direct contact with the work, because of the rapid dissipation of heat, the result can be improved by interposing a metal of lower conductivity and thus conserving the heat in the workpiece. The spread of the strands is prevented by the location of the electrodes at the end. The steel sleeve or equivalent device is not essential in all cases. Its importance diminishes as the metal of the strands is of greater resistance.

The invention embraces not only the process but also the product thereof in which the strands of the cable remain in their original direction with their original strength with or without a sleeve of copper or other metal extending to the very end of the cable. Such a welded joint is useful in a variety of products; for example, in rail bonds made of copper cable with solid terminals of steel, copper or other metal welded to their ends.

Various modifications may be made by those skilled in the art without departing from the invention as defined in the following claims.

What I claim is:

1. The method of butt welding the end of a stranded workpiece to a second workpiece which consists in clamping the stranded piece in an electrode embracing the extreme ends of the strands to hold such ends against lateral movement, pressing them endwise against the second piece and passing a welding current between the two pieces.

2. The method of butt welding the end of a stranded workpiece to a second workpiece which consists in clamping the end of a stranded piece in metal of lower conductivity than that of said stranded workpiece between the electrode and the workpiece and surrounding the latter so as to hold the ends of the strands against lateral movement and to retard the transmission of heat from the work to the electrode, pressing the stranded piece endwise against the second piece and passing a welding current through said clamping metal and across the joint between the two pieces without fusing said clamping metal onto the joint between said stranded workpiece and said second workpiece.

3. The method of butt welding the end of a stranded workpiece to a second workpiece which consists in clamping the end of the stranded piece in a sleeve of the same metal and clamping the latter in metal of lower conductivity to hold the ends of the strands against lateral movement, pressing the stranded piece endwise against the second piece and passing a welding current through the metal of lower conductivity and the sleeve to the stranded piece and across the joint between the two pieces.

4. The method of butt welding the end of a stranded copper cable to a second workpiece which consists in clamping the end of the cable in steel to hold the strands against lateral movement, pressing the cable endwise against the second piece with pressure sufficient to upset said second workpiece when fused and passing a welding current through the steel to the cable and across the joint between the two pieces, said current being sufficient to fuse the second workpiece and permit upsetting without fusing said clamping steel.

5. The method of butt welding the end of a stranded copper cable to a second workpiece which consists in clamping the end of the cable in a sleeve of copper and clamping the latter in steel to hold the ends of the strands against lateral movement, pressing the cable endwise against the second piece and passing a welding current through the steel and the copper sleeve to the stranded piece and across the joint between the two pieces.

6. The method of butt welding a stranded workpiece to a solid workpiece which consists in confining the metal at the end of the stranded piece so as to hold it against lateral upsetting while pressing it endwise against the other piece and leaving the latter free to upset and passing a welding current between the two pieces.

7. The method of butt welding a stranded workpiece to a solid workpiece which consists in clamping them between electrodes, the clamping electrodes for the stranded piece entirely surrounding and embracing it at its end so as to prevent lateral upsetting of the metal, pressing it endwise against the other while leaving the latter free to upset and passing a welding current across the joint.

8. The method of butt welding two workpieces to each other which consists in confining the metal at the end of one of said pieces so as to hold it against lateral upsetting, reducing the cross section of the other piece at its end, pressing the two pieces endwise against each other while leaving the piece of reduced cross-section free to upset and passing a welding current across the joint.

9. In butt welding by pressing the ends of two workpieces together with sufficient pressure to cause upsetting and passing a welding current across the joint between said workpieces, the method which consists in clamping an electrode around the end of the workpiece with interposed metal of a lower conductivity than that of the metal of said work so as to hold it against lateral upsetting and to retard the transmission of heat from the workpiece to the electrode and in passing current through said interposed metal and said workpieces to weld the latter together without welding said interposed pieces thereto.

In witness whereof, I have hereunto signed my name.

GEORGE H. PHELPS.